US010416021B2

(12) United States Patent
Gorenflo et al.

(10) Patent No.: US 10,416,021 B2
(45) Date of Patent: Sep. 17, 2019

(54) METHOD FOR FILL LEVEL MEASUREMENT USING THE TRAVEL TIME PRINCIPLE

(71) Applicant: Endress + Hauser GmbH + Co. KG, Maulburg (DE)

(72) Inventors: Stefan Gorenflo, Hausen (DE); Alexey Malinovskiy, Maulburg (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 68 days.

(21) Appl. No.: 14/782,541

(22) PCT Filed: Feb. 17, 2014

(86) PCT No.: PCT/EP2014/052993
§ 371 (c)(1),
(2) Date: Oct. 5, 2015

(87) PCT Pub. No.: WO2014/166657
PCT Pub. Date: Oct. 16, 2014

(65) Prior Publication Data
US 2016/0047684 A1 Feb. 18, 2016

(30) Foreign Application Priority Data
Apr. 9, 2013 (DE) .......... 10 2013 103 532

(51) Int. Cl.
G01F 25/00 (2006.01)
G01F 23/284 (2006.01)
G01F 23/296 (2006.01)

(52) U.S. Cl.
CPC ........ *G01F 23/284* (2013.01); *G01F 23/2962* (2013.01); *G01F 25/0061* (2013.01)

(58) Field of Classification Search
CPC ... B60G 17/0155; B60G 21/06; G01F 23/284; G01F 23/2962; G01F 25/0061;
(Continued)

(56) References Cited

U.S. PATENT DOCUMENTS 5,504,490 A * 4/1996 Brendle ............... G01F 23/284
340/612
5,614,911 A * 3/1997 Otto ..................... G01F 23/284
342/124
(Continued)

FOREIGN PATENT DOCUMENTS

DE 10260962 A1 7/2004
DE 10360710 A1 10/2005
(Continued)

OTHER PUBLICATIONS

English Translation of International Preliminary Report on Patentability, WIPO, Geneva, dated Oct. 22, 2015.
(Continued)

Primary Examiner — Randy W Gibson
Assistant Examiner — Gedeon M Kidanu
(74) Attorney, Agent, or Firm — Bacon & Thomas, PLLC

(57) ABSTRACT

A method for measuring a fill level of a fill substance in a container with a fill-level measuring device working according to the travel time principle. The fill-level measuring device in measurement operation sends transmission signals toward the fill substance in the container and, based on their signal fractions reflected back in the container, derives echo functions, which give the amplitudes of the signal fractions as a function of their travel time. With the assistance of a table, whose rows correspond to discrete fill levels and whose columns correspond to discrete travel times, and in which are stored as historical measurement points, in each case, in that row, whose row index corresponds to the
(Continued)

associated fill level, information derived from echo functions derived in the past concerning travel times of echo function maxima attributed to reflections on reflectors located in the container, that also delivers reliable measurement results, when measuring conditions at the location of use of the fill-level measuring device can change, wherein the table is continuously updated based on current echo functions derived in ongoing measurement operation, wherein current measurement points derived from current echo functions are stored.

11 Claims, 7 Drawing Sheets

(58) Field of Classification Search
CPC ............... G01F 23/0061; G01F 23/296; Y10T 137/0923; G01S 7/2923; G01S 13/24; G01S 13/003; G01S 13/88; G01S 13/70; G01S 15/88; G01S 7/2927; G01S 7/412
See application file for complete search history.

(56) References Cited

U.S. PATENT DOCUMENTS

| | | | | |
|---|---|---|---|---|
| 5,689,265 A * | 11/1997 | Otto | ...................... | G01F 23/284 340/612 |
| 6,198,424 B1 * | 3/2001 | Diede | ................... | G01F 23/284 324/637 |
| 7,046,189 B2 | 5/2006 | Spanke et al. | | |
| 7,334,470 B1 * | 2/2008 | Bartoli | ................... | G01S 15/101 73/290 V |
| 7,541,970 B1 * | 6/2009 | Godfrey | ............... | G01S 7/2813 342/173 |
| 7,724,355 B1 * | 5/2010 | McIntosh | .............. | G01S 15/104 356/28 |
| 7,819,002 B2 | 10/2010 | Spanke et al. | | |
| 7,826,309 B2 * | 11/2010 | Spanke | ................... | G01F 23/28 367/908 |
| 7,966,141 B2 * | 6/2011 | Spanke | ............... | G01F 23/2962 702/85 |
| 8,065,912 B2 * | 11/2011 | Spanke | ............... | G01F 23/0076 73/290 R |
| 8,276,444 B2 * | 10/2012 | Malinovskiy | ....... | G01F 23/2962 73/290 V |
| 8,639,457 B2 * | 1/2014 | Hammer | ............... | G01F 23/284 342/124 |
| 8,776,594 B2 * | 7/2014 | Welle | .................... | G01F 23/284 367/908 |
| 9,163,971 B2 | 10/2015 | Welle et al. | | |
| 2001/0050629 A1 * | 12/2001 | Benway | ................ | G01F 23/284 342/124 |
| 2004/0257269 A1 * | 12/2004 | Laun | ..................... | G01F 23/284 342/124 |
| 2005/0052314 A1 * | 3/2005 | Spanke | ................. | G01F 23/284 342/124 |
| 2005/0270226 A1 * | 12/2005 | Hager | ....................... | G01S 7/34 342/120 |
| 2006/0052954 A1 | 3/2006 | Welle et al. | | |
| 2006/0119503 A1 * | 6/2006 | Allen | .................... | G01S 7/4017 342/174 |
| 2006/0137446 A1 | 6/2006 | Wennerberg et al. | | |
| 2007/0209434 A1 * | 9/2007 | Peters | ................. | G01F 23/2962 73/290 V |
| 2007/0214880 A1 * | 9/2007 | Spanke | ................. | G01F 23/284 73/290 V |
| 2008/0154522 A1 * | 6/2008 | Welle | .................... | G01F 23/284 702/55 |
| 2009/0146867 A1 * | 6/2009 | Delin | .................... | G01F 23/284 342/124 |
| 2010/0162811 A1 * | 7/2010 | Malinovskiy | ......... | G01F 23/284 73/290 V |
| 2010/0182190 A1 * | 7/2010 | Spanke | ................. | G01F 23/284 342/124 |
| 2011/0166805 A1 * | 7/2011 | Hammer | ............... | G01F 23/284 702/55 |
| 2012/0265486 A1 * | 10/2012 | Klofer | ................. | G01F 23/0061 702/166 |
| 2014/0052389 A1 * | 2/2014 | Welle | .................... | G01F 23/284 702/55 |

FOREIGN PATENT DOCUMENTS

| | | |
|---|---|---|
| DE | 102004052110 A1 | 5/2006 |
| DE | 112005003220 T5 | 4/2008 |
| EP | 2372388 A1 | 10/2011 |
| EP | 2527805 A1 | 11/2012 |
| WO | 2006068604 A1 | 6/2006 |
| WO | 2012100814 A1 | 8/2012 |

OTHER PUBLICATIONS

International Search Report,, EPO, The Netherlands, dated Jul. 7, 2014.
German Search Report, German PTO, Munich, dated Dec. 23, 2013.

* cited by examiner

METHOD FOR FILL LEVEL MEASUREMENT USING THE TRAVEL TIME PRINCIPLE

TECHNICAL FIELD

The invention relates to a method for measuring a fill level of a fill substance in a container with a fill-level measuring device working according to the travel time principle. In measurement operation, the fill-level measuring device sends transmission signals toward the fill substance in the container, and, based on their signal fractions reflected back in the container, derives echo functions, which give the amplitudes of the signal components as a function of their travel time, with the assistance of a table, whose rows correspond to discrete fill levels and whose columns correspond to discrete travel times, and in which are stored as historical measurement points, in each case, in that row, whose row index corresponds to the associated fill level, information derived from echo functions derived in the past concerning travel times of echo function maxima attributed to reflections on reflectors located in the container.

BACKGROUND DISCUSSION

Fill level measuring devices working according to the travel time principle are applied in a large number of branches of industry, e.g. in the processing industry, in the chemicals industry and in the foods industry.

In the case of fill level measurement, short transmission signals, e.g. microwaves or ultrasonic waves, are sent periodically by means of an antenna toward the surface of a fill substance and their signal components reflected on the surface are received back after a travel time dependent on the traveled path. An echo function representing the echo amplitudes as a function of travel time is formed. Each value of this echo function corresponds to the amplitude of the signal fractions reflected at a certain separation from the antenna.

That maximum of the echo function is determined, which probably is attributable to a reflection of the transmission signal on the surface of the fill substance. In such case, it is assumed, as a rule, that this maximum, subsequently referred to as the fill-level echo, has a greater amplitude than the remaining maxima of the same echo function. There results directly from the travel time of the fill-level echo, in the case of a fixed propagation velocity of the transmission signals, the separation between the surface of the fill substance and the antenna.

This conventional procedure functions without problem in a large number of applications. Problems occur, however, when the fill-level echo cannot be identified without there being some doubt as to the correctness of the identification. This can be the case, for example, when there are located in the container disturbances, such as, for example, installed objects, which reflect the transmission signals better than the surface of the fill substance.

In such cases, the current fill level can be specified once, e.g. at start-up of the fill-level measuring device. The fill-level measuring device can based on the predetermined fill level identify the maximum attributable to such as fill-level echo and track that, e.g. using a suitable algorithm. In such case, e.g. in each measuring cycle, maxima of the echo function are determined and, based on knowledge of the fill level ascertained in the preceding measuring cycle and an application-specific maximum expected rate of change of the fill level, a travel time range ascertained, in which the fill-level echo is to be expected in the current echo function. Then, based on the travel time of the maximum arising in this travel time range in the current echo function, the current fill level is determined.

Such echo tracking has the disadvantage that the fill-level echo must be tracked without interruption. When the fill-level measuring device is taken out of operation, e.g. for maintenance purposes, the fill-level echo can then not be further tracked. The fill-level measuring device is then upon restart in given cases not able to detect the fill-level echo reliably. The current fill level must again be predetermined. This can, however, in given cases mean considerable effort. When e.g. no alternative measuring methods are available, it can be necessary to empty the container completely or to fill it completely or up to a reference mark. This means in an industrial environment frequently an interruption of a manufacturing process and can be associated with considerable time consumed and high costs.

For overcoming these problems, a method is proposed in German patent, DE 10,260,962 A1 for measuring a fill level of a fill substance in a container with a fill-level measuring device working according to the travel time principle, wherein in measurement operation transmission signals are sent toward the fill substance in the container and based on their signal fractions reflected back in the container echo functions are derived, which give the amplitudes of the signal fractions as a function of their travel time, wherein following a first start-up of the fill-level measuring device there is created and subsequently used for fill level measurement a table, whose rows correspond to discrete fill levels and whose columns correspond to discrete travel times, in which information derived from echo functions derived following start-up concerning travel times of echo function maxima attributed to reflections on reflectors located in the container are stored as measurement points, in each case, in that row, whose row index corresponds to the associated fill level.

The table is generated in such case, for example, by predetermining once at the beginning the current fill level, identifying the fill-level echo based on this predetermined known fill level, and tracking its time development based on the subsequently recorded echo functions by means of an echo tracking method over a time range, in which the fill level passes through the total fill level measuring range. Therewith, the subsequently recorded echo functions can based on the travel time of the tracked fill-level echo contained therein, be associated, in each case, with a fill level and information derived from the respective echo functions entered in the table as measurement points. Generated as derived information can be, for example, measurement points, which give amplitude and travel time or also only the travel time of the maxima of the echo functions in connection with the respectively associated fill level.

Alternatively, the table can also be generated without specifying a current fill level. In this case, the fill-level measuring device measures the fill level in conventional manner, takes into consideration the measured fill level as starting point for the above mentioned echo tracking, and the table is correspondingly developed. In that case, a plausibility check is subsequently performed based on the table, in order to assure that taken into consideration as starting point of the echo tracking was actually a fill-level echo and not, for example due to an incorrect fill level measurement, a maximum of the echo function attributable to another reflector.

For this, there are determined based on the information stored in the table elevation lines, which give, in each case, the travel times of maxima attributable to a determined reflector as a function of the fill level. If there results therefrom below the elevation line associated with the fill-level echo an elevation line section, whose travel times increase with increasing fill level, then the interpretation of the maximum used as starting point for the echo tracking of the fill-level echo is disproved, the table is thrown away, and a new table created.

Once the table has been created over the total fill level measuring range, it is then available for all following fill-level measurements. In such case, selected for the respectively currently derived echo function is that table row, which has the greatest agreement with the current echo function, and the current fill level is determined based on the table or in other manner determined and checked based on the table. In such case, for example, based on the fill level corresponding to the table row, a travel time window can be determined for the fill-level echo, and the exact fill level then determined based on the travel time of the maximum of the current echo function located in this travel time window. Alternatively or supplementally, echo tracking methods can be applied, based on which likewise a travel time window is determined, in which the fill-level echo is to be expected. In that case, the table can be applied continuously to check the identification of the tracked echo as fill-level echo.

The method thus delivers reliable results even under difficult measuring conditions. Such is true, however, only so long as the measuring conditions at the location of use remain unchanged. If the measuring conditions at the location of use change, then the stored table no longer correctly reflects the situation in the container. This can be the case, for example, when the properties of the fill substance located in the container change, especially because of chemical processes occurring in the container, a replacement of the fill substance or by adding of other fill substance components, or installed objects in the container are removed, added or changed in their position or properties.

If the former table would continue to be used unchanged, such could, depending on type of change of the measuring conditions, lead in given cases to considerable measurement errors.

SUMMARY OF THE INVENTION

It is an object of the invention to provide a method for fill level measurement according to the travel time principle referencing a table and delivering reliable measurement results when measuring conditions at the location of use of the fill-level measuring device change.

For achieving this object, the invention resides in a method for measuring a fill level of a fill substance in a container with a fill-level measuring device working according to the travel time principle, wherein the fill-level measuring device in measurement operation sends transmission signals toward the fill substance in the container and, based on their signal fractions reflected back in the container, derives echo functions, which give the amplitudes of the signal fractions as a function of their travel time, with the assistance of a table,
  whose rows correspond to discrete fill levels and whose columns correspond to discrete travel times, and
  in which are stored as historical measurement points, in each case, in that row, whose row index corresponds to the associated fill level, information derived from echo functions derived in the past concerning travel times of maxima attributed to reflections on reflectors located in the container,
  wherein the table is continuously updated based on current echo functions derived in ongoing measurement operation, wherein
    information derived from current echo functions concerning travel times of echo function maxima attributed to reflections on reflectors located in the container is stored as current measurement points, in each case, in that row, whose row index corresponds to the associated fill level ascertained by the fill-level measuring device,
    a plausibility check is performed based on the historical and the current measurement points, and
    historical and current measurement points recognized as implausible due to the plausibility check are deleted and all remaining current measurement points are adopted into the table as historical measurement points.

In an embodiment, the current measurement points are, in each case, adopted into the row corresponding to the associated fill level in a table field corresponding to the associated travel time, wherein historical measurement points already adopted into the remaining table fields of the respective row are kept in place.

An embodiment of the latter embodiment includes a method, in the case of which
  the measurement points reflect besides the travel time and the associated fill level supplementally the amplitude of the associated maximum of the current echo function, and
  the amplitude of the associated maximum of the current echo function is stored unchanged in the associated table field, when the associated table field was empty before the recording of the current measuring point, and
  from the amplitude of the historical and the amplitude of the current measuring points, a filter forms an intermediate value, which is stored in the table field as amplitude, when the associated table field was occupied with a historical measuring point before the recording of the current measuring point.

A further development of the invention includes a method, in the case of which
  based on correspondingly selected current and historical measurement points stored in the table, at least one correction line segment is determined, which shows a dependence of fill level on travel times associated with reflections on a determined reflector in the container different from the fill substance,
  the plausibility check includes a method, in the case of which a measure is determined for a scattering of the measurement points around the correction line segment and referenced for determining the respective correction line segment, and
  current and historical measurement points referenced for determining the respective correction line segment are deleted, when the scattering exceeds a predetermined threshold value.

Another further development includes a method, in the case of which
  based on correspondingly selected current and historical measurement points stored in the table, at least one correction line segment is determined, which shows a dependence of fill level on travel times associated with reflections on a determined reflector in the container different from the fill substance in a fill level range, in which this reflector is covered by fill substance, the plausibility check includes a method, in the case of which a slope corresponding to the propagation velocity of the signals in the fill substance is determined for at least one of these correction line segments,
a propagation velocity corresponding to the slope is compared with a reference value or a reference value range for the propagation velocity expected in the fill substance, and
the referenced current and historical measurement points for determining the respective correction line segment are deleted, when the propagation velocity corresponding to the ascertained slope lies outside a propagation velocity range predetermined based on the reference value or the reference value range.

Another further development of the invention includes a method, in the case of which
based on correspondingly selected current and historical measurement points stored in the table, at least one correction line segment is determined, which shows a dependence of fill level on travel times associated with reflections on a determined reflector in the container different from the fill substance in a fill level range, in which this reflector is covered by fill substance, and
the plausibility check includes a method, in the case of which current measurement points presumably to be associated with a reflection on this reflector are only accepted as historical measurement points, when they occur within a table region around this correction line segment predetermined based on a reference value or a reference value range for the propagation velocity expected in the fill substance or based on the slope of the respective correction line segment.

Another further development of the invention includes a method, in the case of which
echo types are predefined for maxima of the echo functions,
the individual echo types refer, in each case, to those maxima, which are attributable to a simple reflection or a multiple reflection on a determined reflector associated with the echo type, wherein the reflectors include at least the surface of the fill substance and the container floor,
the travel times of the maxima of an echo function derived directly after a resuming of measurement operation are determined,
at least two of these maxima are selected,
a number of echo types corresponding to the number of selected maxima are selected, of which one is necessarily the type of a fill-level echo attributable to a reflection on the surface of the fill substance,
for all possible permutations of the associating of the selected maxima to the selected echo types
in each case, the fill level resulting from such association is determined,
in each case, preliminary measurement points are determined based on such fill level,
in each case, a degree of agreement of the preliminary measurement points with the historical measurement points stored in the associated table row is determined, and
there are stored in the table as current measurement points those preliminary measurement points, for which the greatest agreement was determined.

Additionally, the invention resides in a method according to the latter further development, in the case of which
based on the association, at which the greatest agreement was determined, an echo tracking method is started, based on which at least the time development of the presumed fill-level echo is tracked,
the current measurement points obtained from subsequent echo functions based on such association are adopted into the table,
based on the current and historical measurement points stored in the table, correction line segments are determined, which, in each case, give a dependence of fill level on travel times associated with reflections on a determined reflector, and
the association is eliminated, when below the correction line segment associated with reflections on the surface of the fill substance, a correction line segment is present, whose travel times increase with increasing fill level.

Additionally, the invention resides in a further development of the aforementioned method, in the case of which
based on measurement points stored in the table, correction line segments are determined, which, in each case, give a dependence of fill level on travel times associated with reflections on a determined reflector, and
before each interruption of measurement operation, beginning- and end points of individual correction line segments are stored in the fill-level measuring device, and
in the case of a subsequent resumption of measurement operation, based on the beginning- and end points of the correction line segments, a table is generated, which has entries arranged distributed along the correction line segments, and
this table is applied as start table for subsequent measurement operation, wherein the entries are considered to be historical measurement points.

In a further development of the latter further development, for each correction line segment, a measure of scattering of the measurement points around the particular correction line segment and referenced for determining the respective correction line segment is determined and stored together with their beginning and endpoints.

Additionally, the invention resides in a further development of the invention or the first named embodiment, in the case of which
over a time range, in which the fill level spans a fill level measuring range of predetermined minimum size, it is checked, whether the current measurement points derived during this time range include measurement points, which can be associated with a reflection on a disturbance registered in the table, and
all reflections on this disturbance associated with historical measurement points are deleted, when within this period of time no current measuring point was derived, which can be associated with a reflection on the disturbance registered in the table.

BRIEF DECRIPTION OF THE DRAWINGS

The invention and other advantages will now be explained in greater detail based on the figures of the drawing showing an example of an embodiment; equal elements are provided in the figures with equal reference characters. The figures of the drawing show as follows.

Figure 4:
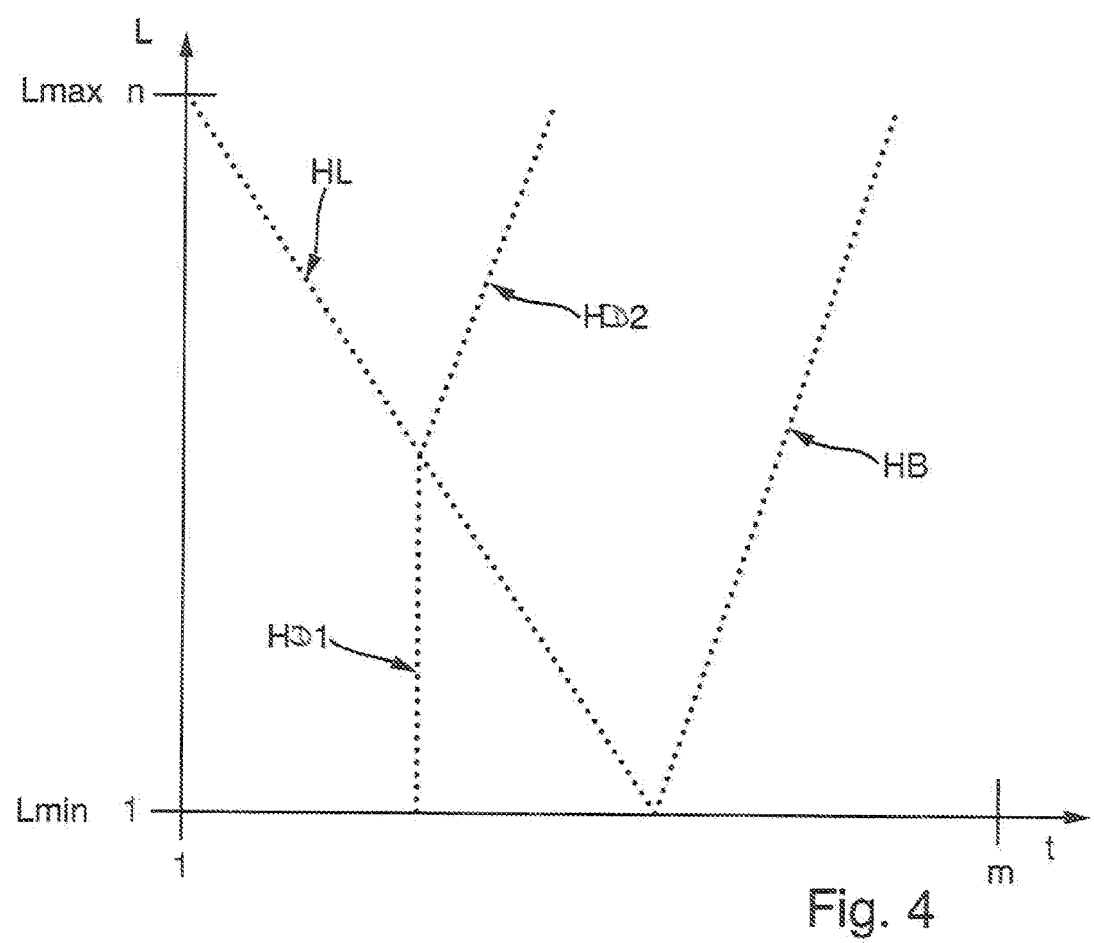
FIG. 4 is a table created based on measurement points derived from the echo functions of FIG. 3.
Figure 8:
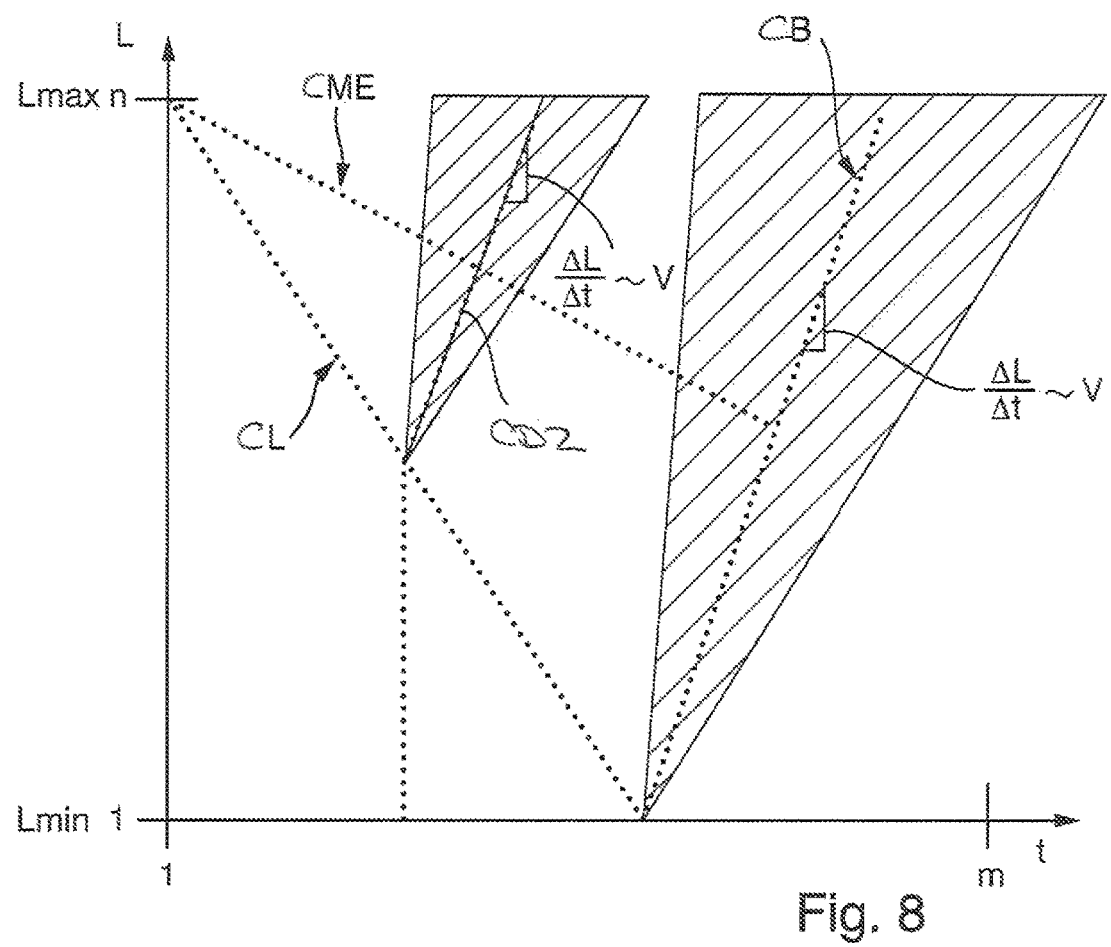
Figure 9:
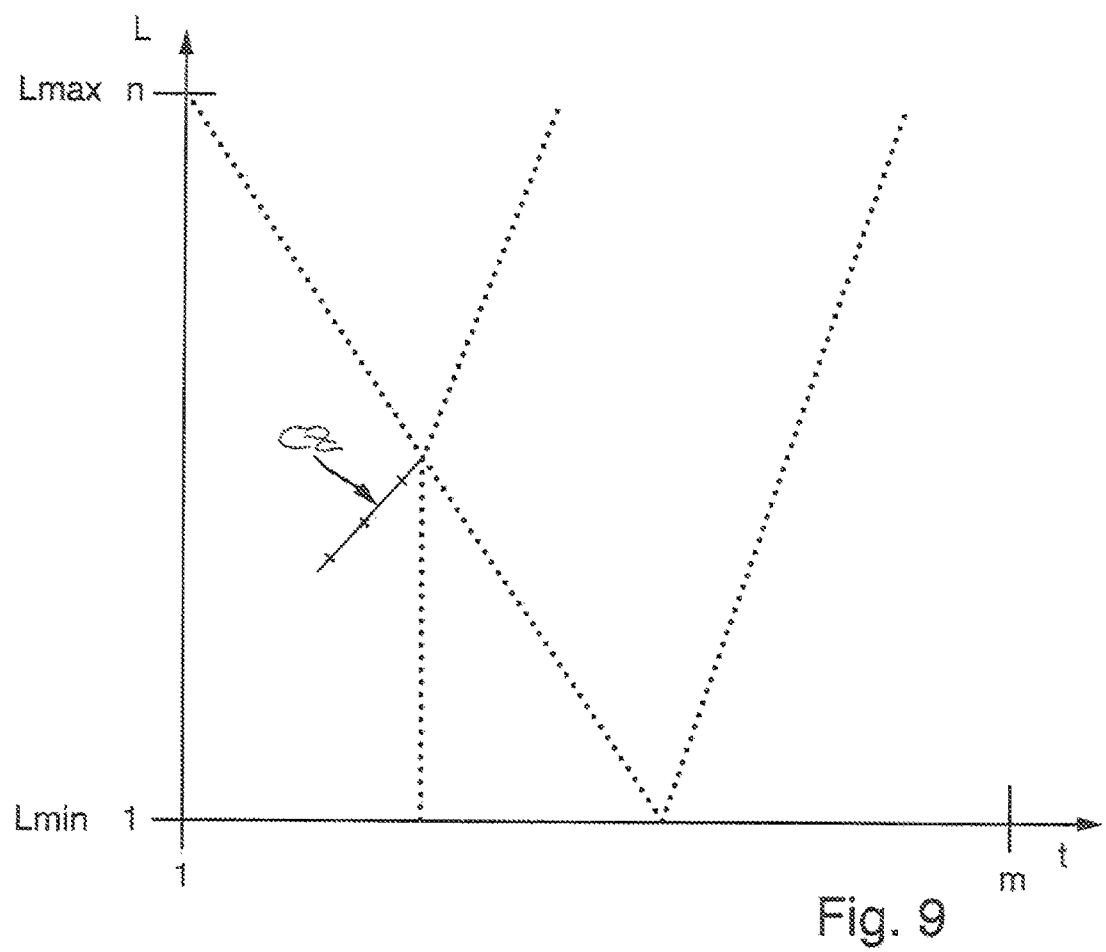

FIG. 8 is a table, in which measurement points are present, which can be attributed to a two-time reflection on the surface of the fill substance, and in which a table region around a correction line segment is shown by measurement points associated with reflections on the container floor, outside of which region measurement points attributed to reflections on the container floor cannot occur; and FIG. 9 is an updating of the table of FIG. 4 by measurement points obtained based on an incorrect echo association.

DETAILED DISCUSSION IN CONJUCTION WITH THE DRAWINGS

Figure 1:
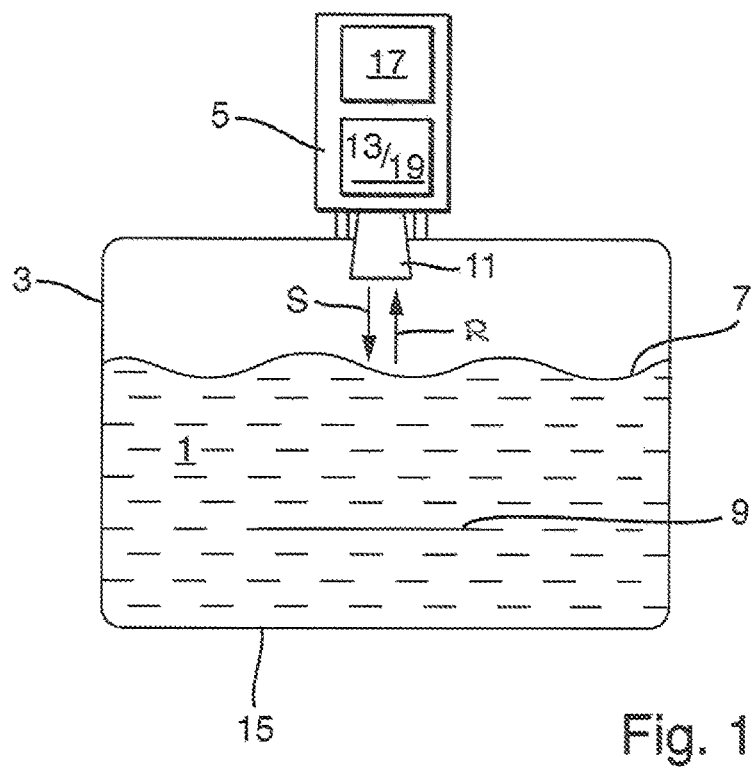
FIG. 1 is an arrangement for fill level measurement with a fill-level measuring device working according to the travel time principle.

FIG. 1 shows an example of an arrangement for fill level measurement, in which the method of the invention is applicable. The arrangement includes, filled with a fill substance 1, a container 3, on which is arranged a fill-level measuring device 5 working according to the travel time principle. Suited as fill-level measuring device 5 is e.g. a fill-level measuring device working with microwaves or a fill-level measuring device working with ultrasound. Fill-level measuring device 5 serves to measure a fill level L of the fill substance 1 in the container. Drawn in the container 3, by way of example, is a disturbance 9. Disturbances 9 can be e.g. objects installed in the container 3, stirring mechanisms and, of course, any other structure, on which reflections can occur. That here only a single disturbance 9 is provided serves for easier understanding and perspicuity. Of course, in real measuring situations, many more disturbances can be present.

Fill-level measuring device 5 includes, for example, an antenna 11 for sending transmission signals S and for receiving their signal fractions R reflected back in the container 3. In the illustrated example of an embodiment, a single antenna 11 is provided, which both sends as well as also receives. Alternatively, however, also an antenna for sending and at least one other antenna for receiving can be provided.

The transmission signals S are sent toward the fill substance 1 and reflected on a surface of the fill substance 7, on disturbances 9 located in the container 3 and on the container floor 15. The superpositioning of these reflections forms the echo signal R.

The method of the invention is, however, not limited to fill-level measurements, in the case of which the transmission signals S are freely radiated. It is analogously applicable also in the case of fill-level measurements according to the travel time principle, in the case of which electromagnetic signals are sent along a waveguide in the container, and their signal fractions reflected back along the waveguide are received after a travel time dependent on the traveled path.

In the case of fill level measurement according to the travel time principle, transmission signals S, e.g. short microwaves- or ultrasonic pulses, are periodically transmitted in the direction of a fill substance 1, their signal fractions R reflected back on reflectors located in the container 3 registered and forwarded to a signal processing 13, which based on the received signal fractions R derives an echo function A(t), which contains the amplitudes A of the signal fractions R as a function of their travel time t required for the distance traveled in the container 3.

Figure 2:
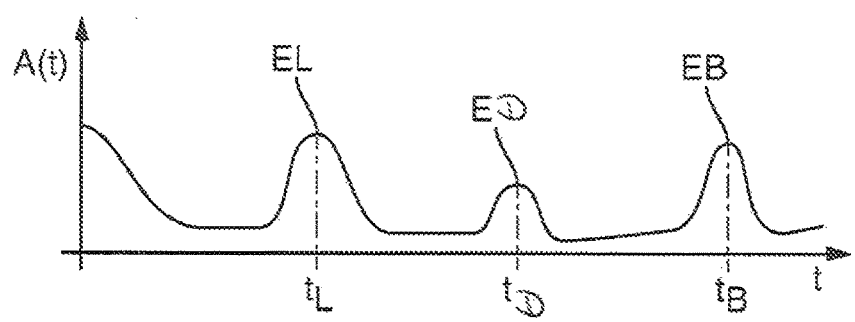
FIG. 2 is an echo function.

FIG. 2 shows an example of such an echo function A(t) for the arrangement of FIG. 1. The echo function includes three marked maxima. The first maximum is fill-level echo EL attributable to a reflection on the surface of the fill substance, the second maximum is a disturbance echo ED attributable to a reflection on the disturbance 9, and the third maximum is a container floor echo EB attributable to a reflection on the container floor, or bottom, 15 of the container 3. The three echos occur after travel times $t_L$, $t_S$, $t_B$, which correspond to the distances between the antenna 11 and the surface of the fill substance, the disturbance 9, and the floor, or bottom, 15, respectively.

Fill-level measuring device 5 includes a memory 17, in which a table is stored, whose rows correspond to discrete fill levels L (here increasing with increasing row index [1, . . . , n]) and whose columns correspond to discrete travel times t (here increasing with increasing column index [1, . . . , m]). Stored in the table as historical measurement points, in each case, in that row, whose row index corresponds to the associated fill level L, is information derived from echo functions A(t) derived in the past concerning travel times t of maxima of these echo functions A(t) attributed to reflections on reflectors located in the container.

Equivalent to the associated fill levels L are naturally the associated travel times $t_L$ of the fill-level echo EL, respectively the associated distances to the surface of the fill substance 7. These variables are directly proportional to one another and can be converted into one another simply by means of a known signal propagation velocity.

In such case, not all the information contained in the echo functions A(t) needs to be reflected in the table in detail. The information stored in the table can thus be rather strongly simplified information derived therefrom. As derived information, for example, measurement points can be generated, which give the amplitude A and the travel time t or even only the travel time t of the maxima of the echo functions A(t) in connection with the respectively associated fill level L. Additionally, threshold values for a minimum amplitude can be fixed, which a maximum must at least have, in order to gain entry into the table.

This table is initially created following a first start-up of the measuring device in ongoing measurement operation. Applied for this is preferably the method described in DE 102 60 962 A1.

In such case, over a time range, in which the actually present fill level moves through the fill level measuring range once, echo functions A(t) and associated fill levels L are ascertained, and information derived as measurement points from the respective echo functions A(t) are stored in the table. In such case, each measuring point reflects at least the travel time $t_i$, a maximum of one of the echo functions A(t) and the associated fill level $L_i$.

Figure 3:
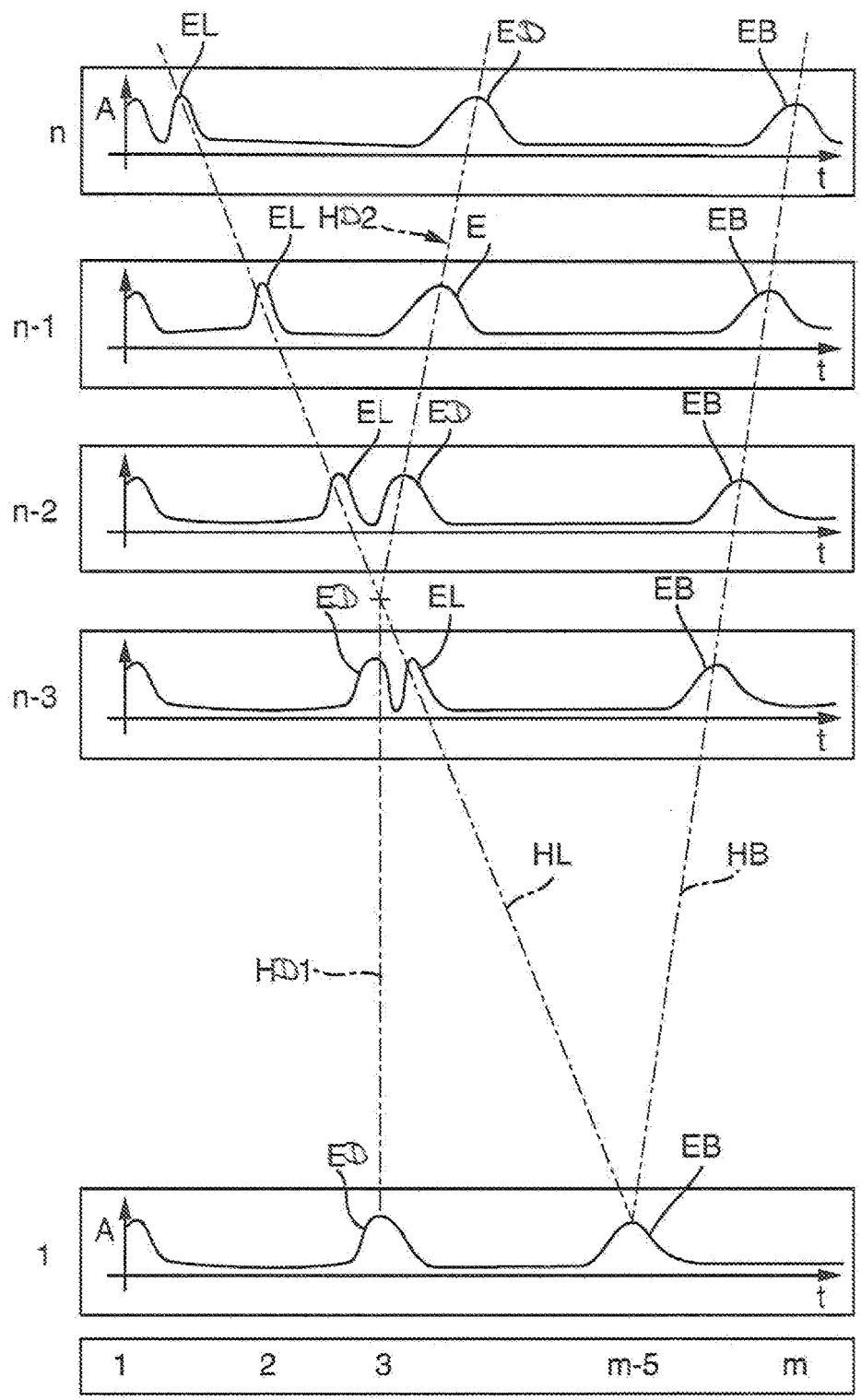
FIG. 3 is a sequence of echo functions recorded one after the other in the case of sinking fill level.

FIG. 3 shows, for this, a sequence of echo functions A(t) recorded one after the other over the course of completely emptying the initially full container. For purposes of illustration, FIG. 3 shows the row indices from 1 to n and the column indices from 1 to m, where the information derived from the respective echo functions A(t) are adopted into the table as historical measurement points.

FIG. 4 shows a graphical representation of the table resulting from these echos functions. Adopted into the table are the measurement points ($L_i$, $t_i$) derived from the echo functions A(t) illustrated in FIG. 3.

In this idealized example for illustrating the principle, the measurement points attributable to the reflections on determined reflectors, here the surface of the fill substance 7, the container floor 15 and the disturbance 9, extend along clearly perceivable line segments.

In such case, the fill level line segment HL attributed to reflections on the surface of the fill substance has at maximum fill level $L_{max}$ the shortest travel time t, which then continuously increases with sinking fill level L.

Conversely, the container floor line segment HB attributed to reflections on the container floor 15 has at minimum fill level $L_{min}$ the shortest travel time t, which then continuously increases with increasing fill level L.

In contrast, the measurement points attributable to reflections on the disturbance 9 form two line segments HD1, HD2, which meet at the fill level line segment HL. The disturbance line segment HD1 extending below the fill level line segment HL extends at a constant travel time t, while the travel times t of the disturbance line segment HD2 extending above the fill level line segment HL increase with increasing fill level L.

The table is subsequently taken into consideration for fill level measurement. This can occur, for example, in such a manner that it is used in echo functions A(t) registered in subsequent ongoing measurement operation to detect the fill-level echo EL attributed to the reflection on the surface 7 of the fill substance. For this, information derived from the current echo function A(t) can be compared with the information contained in the table, and, via this, that table row, and therewith the associated fill level L, determined, in the case of which the greatest agreement with the information stored in the table is present.

This can be directly output as measured fill level. Preferably, based on the table row with the greatest agreement, a travel time window is defined, in which the fill-level echo EL of the current echo function A(t) is ascertained. In that case, the fill level L corresponding to the travel time $t_L$ of the fill-level echo EL in the current echo function A(t) is output as measurement result. Alternatively or supplementally, the table can be applied for initializing and/or monitoring of the echo tracking method, with whose help the fill level L is then determined.

In such case, preferably for the maxima of the echo functions, echo types are predefined. Each echo type refers, in each case, to those maxima, which are attributable to a simple reflection or a multiple reflection on a certain predetermined reflector. The most important echo type, here referred to as fill-level echo EL, includes the maxima attributable to reflections on the surface 7 of the fill substance. Other echo types include the container floor echo EB attributable to reflections on the container floor 15, as well as disturbance echos ED attributable to reflections on a determined disturbance 9. Moreover, also selected multi-echos, such as e.g. maxima attributed to two-time reflection on the surface of the fill substance, can be predefined.

In the echo tracking, echos of selected echo types, especially the fill-level echo EL, are identified in an echo function A(t) based on the table or in other manner and the time development of the associated travel time t in the subsequently recorded echo functions A(t) tracked, and taken into consideration especially for determining the travel time $t_L$ of the fill-level echo EL in the current echo function A(t) t. In such case, the associating of the tracked echos to the respective echo type is preferably continuously checked based on the table.

According to the invention, the table created following the first start-up of the fill-level measuring device is continuously updated based on current echo functions A(t) derived in subsequent ongoing measurement operation.

The updating occurs by storing information derived from current echo functions A(t) concerning travel times t of echo function maxima attributed to reflections on reflectors located in the container 3 as current measurement points, in each case, in that row, whose row index corresponds to the associated fill level L ascertained by the fill-level measuring device 5.

In this way, it is achieved that changes of the measuring conditions at the location of use, such as e.g. changes of the fill substance or changes as regards disturbance 9 present in the container, are input into the table, and, thus taken into consideration in the case of subsequent measurements.

In such case, procedure is preferably such that the current measurement points are, in each case, adopted into the corresponding table field, and historical measurement points already adopted into the remaining table fields of the respective row are kept in place. If the measurement points contain besides the travel time t and the associated fill level L supplementally the amplitude of the associated maximum of the current echo function A(t), it is preferably checked, whether the associated table field is empty, or whether a historical measuring point has already been adopted. If the table field is empty, the amplitude is stored unchanged. If the table field already contains a historical measuring point, preferably there is formed from the amplitude of the historical measuring point and the amplitude of the current measuring point by means of a filter an intermediate value, which is then stored as amplitude in the associated table field.

An updating of the table is, however, only worthwhile when conditions have actually changed. Thus, used for updating are only such measurement points actually correctly reflecting the conditions at the location of use. In such case, there is the problem that it is not directly recognizable, whether deviations of the current measurement points from the total picture given by the historical measurement points are accidental, result from measurement errors, or are attributable to changes of the measuring conditions.

According to the invention, a plausibility check based on the historical and the current measurement points is performed for solving this problem, and all historical and/or current measurement points detected as implausible due to the plausibility check are deleted and all remaining current measurement points are adopted as historical measurement points into the table.

In this way, it is, on the one hand, achieved that non-trustworthy current measurement points do not even get into the table in the first place. On the other hand, it is achieved that at least initially plausible appearing current measurement points are incorporated as historical measurement points into the table, but remain there only until a detectable disagreement results. Therewith, it is assured that fluctuations occurring in normal operation without change of the measuring conditions at the location of use can bring about no basic change of the table, while, in contrast, relevant changes of the measuring conditions can be registered comparatively near in time, and not only the thereby registered, current, but, instead, also the thereby registered historical, measurement points deleted, and the corresponding table content can be newly created in the face of the changed measuring conditions.

The plausibility check occurs based on at least one review method, which is performed based on the current and the historical measurement points. Preferably, as many as possible different review methods are applied in parallel with one another.

A review method that can be applied for this involves features as follows: based on correspondingly selected current and historical measurement points stored in the table, correction line segments are determined, which reflect the dependencies of fill level L on travel times t associated with reflections associable, in each case, with one and the same reflector different from the surface of the fill substance 7. In such case, for reflectors, which, depending on fill level L, can be located above or below the surface of the fill substance 7, two correction line segments are determined, of which one extends above and one below the line giving the fill level L as a function of travel time t.

Figure 5:
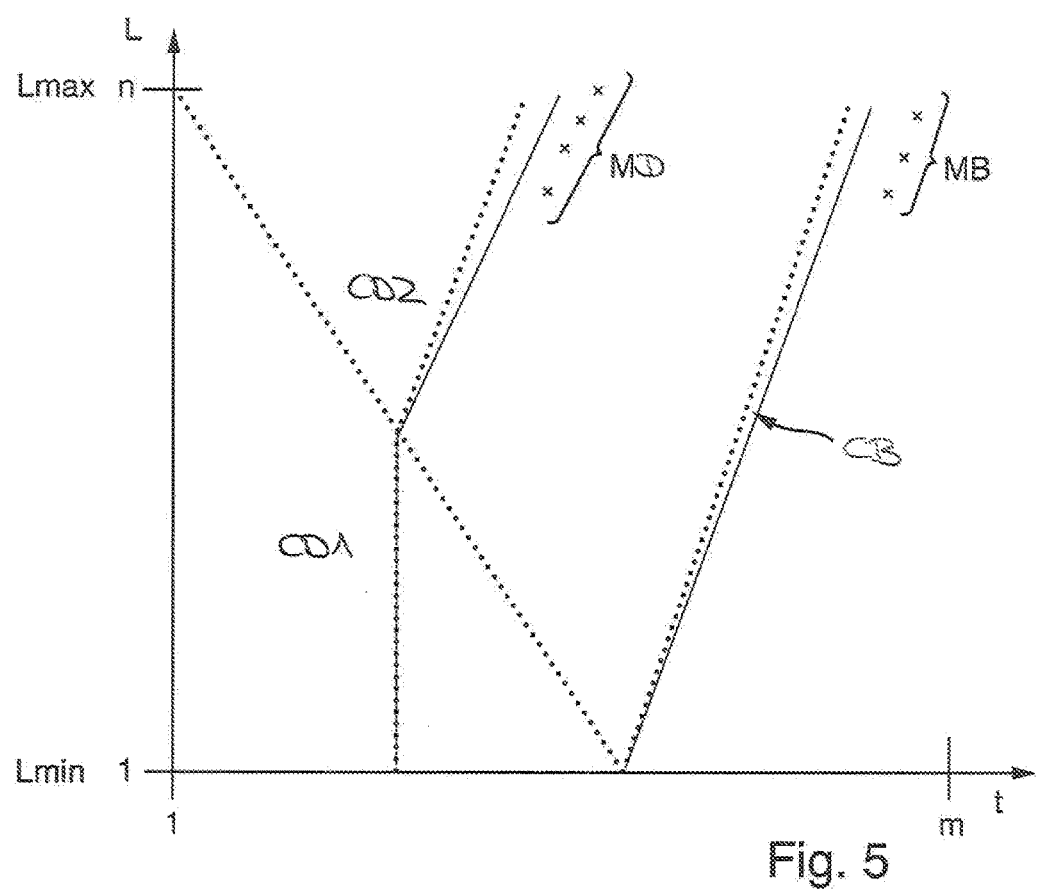
FIG. 5 is an updating of the table of FIG. 4 following a chemical reaction in the fill substance.

FIG. 5 shows as an example for this an updating of the table of FIG. 4. Thus, a correction line segment CB is shown, which gives the dependence of fill level L on travel times t associated with reflections on the container floor 15. Additionally shown here are two correction line segments CD1 and CD2 attributable to reflections on the disturbance 9. The correction line segment CD1 gives the dependence of fill level L on travel times t associated with reflections on the disturbance 9 for those fill levels, in the case of which the disturbance 9 is located above the fill substance 1. The correction line segment CD2 gives the dependence of fill level L on travel times t associated with reflections on the disturbance 9 for those fill levels, in the case of which the disturbance 9 is located below the fill substance 1.

Then, a measure for a scattering a of the current and historical measurement points around the particular correction line segment CB, CD1, CD2 and referenced for determining the respective correction line segment CB, CD1, respectively CD2, is determined.

If the scattering a of these measurement points around the associated correction line segment CB, CD1, CD2 ascertained based on the current and the historical measurement points exceeds a predetermined threshold value, then, as a precaution, all measurement points referenced for determining the affected correction line segments CB, CD1, CD2 are deleted.

If unchanged measuring conditions are present, only small scatterings a of the measurement points around the particular correction line segments CP, CD1, CD2 occur, and the respective threshold values are not exceeded. So long as this is the case, the table reflects the unchanged measuring conditions in the container 3 correctly.

Since the table is continuously updated in the above described manner, it continuously adapts to changed measuring conditions.

If the propagation velocity of the signals in the fill substance 1 has changed due to a fill substance change, then this leads to the fact that the scattering σ is increased at least over a certain time range by the newly entering measurement points. FIG. 5 shows, for this, a table, such as results, when the table shown in FIG. 4 is updated by measurement points MD, MB derived from echo functions A(t) obtained in the case of three different fill levels L lying above the disturbance 9 following a chemical reaction changing the propagation velocity of the transmission signals S in the fill substance 1. Due to the now changed propagation velocity, the measurement points MS associable with the reflection on the disturbance 9 and the measurement points MB associable with the reflection on the container floor 15 lie at a greater distance from the respective correction line segment CB, respectively CD2, as determined still essentially by the greater number of measurement points recorded before the chemical reaction.

As soon as the scattering a around the particular correction line segment CB, respectively CD2, exceeds the associated threshold value, the problem is automatically recognized by the fill-level measuring device 5. Since all measurement points referenced for deriving the respective correction line segment CB, CD2 have been deleted, it is assured that no unreliable information can be taken into consideration for fill level measurement.

Figure 6:
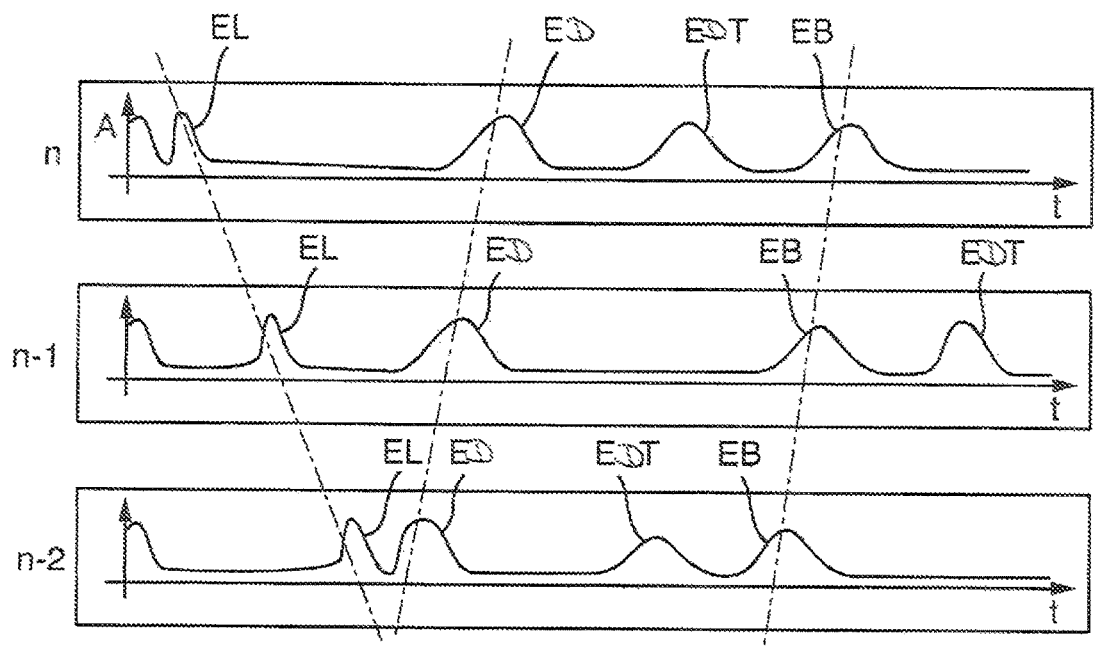
FIG. 6 is a sequence of echo functions recorded one after the other in the case of sinking fill level, wherein an electromagnetic disturbance signal is superimposed on the received echo signal.

Another cause for a greater, respectively increasing, scattering σ of the measurement points is electromagnetic disturbance signals, which superimpose on the echo signals E e.g. in the signal processing 13. This can show up in the echo functions A(t) as maxima, which can behave physically similarly to maxima attributed to signal fractions reflected on the container floor 15. FIG. 6 shows a time example of sequentially recorded echo functions A(t) occurring in the case of sinking fill level, wherein a wandering disturbance echo EDT caused by electromagnetic disturbing influences is present.

Figure 7:
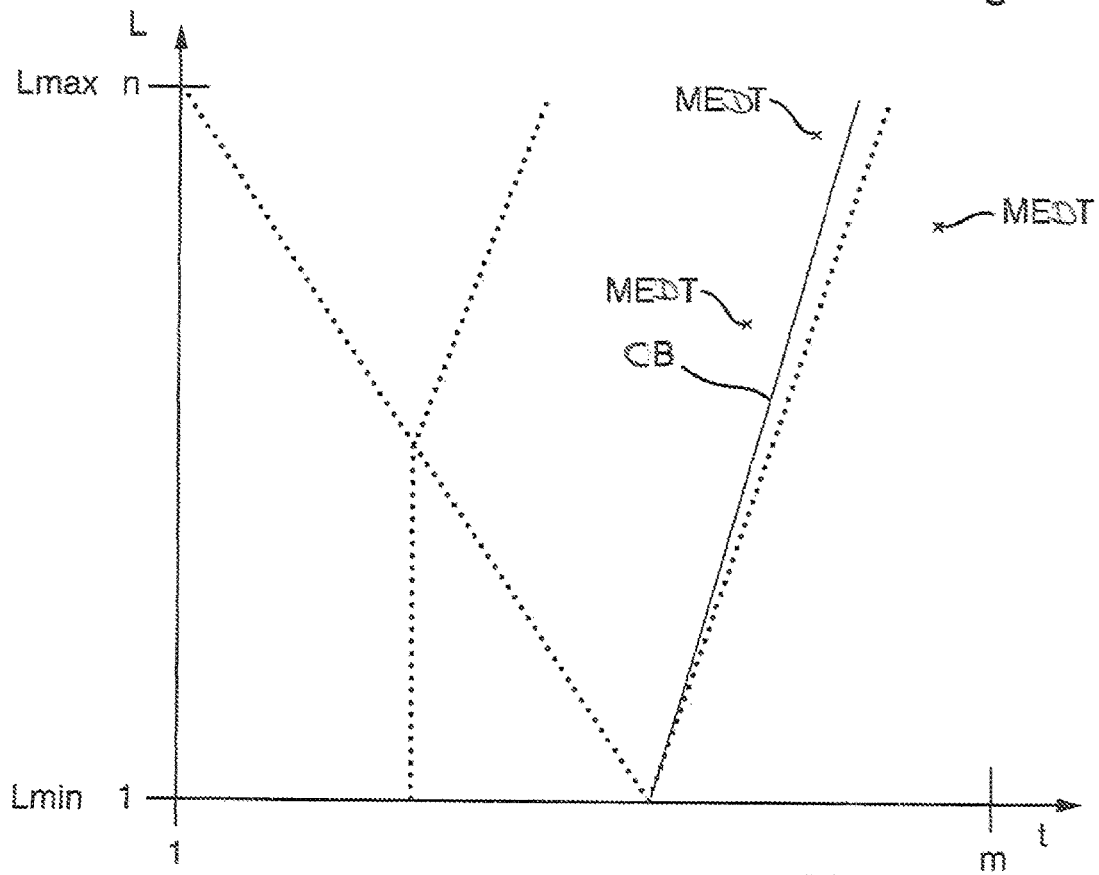
FIG. 7 is an updating of the table of FIG. 4 based on measurement points derived from the echo functions of FIG. 6.

These disturbing influences can thus result in measurement points, which are not directly distinguishable from measurement points attributable to reflections on the container floor 15 and accordingly can be incorrectly interpreted as such. FIG. 7 shows, for this, the table of FIG. 4 supplemented by the measurement points MEDT derived from the echo functions A(t) of FIG. 6.

Since of concern are disturbance signals, the associated disturbance echos EDT occur at fluctuating travel times t independently of the fill level L. Correspondingly, the scattering σ of the measurement points around the correction line segment CB increases when these disturbances echo measurement points MEDT are incorporated.

In order to avoid that these measurements points lead to changes of the table that might affect the fill level measurement, they are also here recognized, as soon as the scattering a exceeds the threshold value. Since the measurement points MEDT attributable to the disturbance signals cannot be distinguished from the measurement points attributable to the reflection on the container floor 15, also here as a precaution, all measurement points referenced for deriving the correction line segment CB are deleted.

Due to the continuing updating of the table, the information gap resulting from deleting the current and historical measurement points referenced for the correction line segment CB is progressively closed as operation continues. Thus, the table continues to be built based on the current measurement points derived in the continuing measurements with continued plausibility checking. In such case, it is assured in the deriving of the current measurement points that exclusively reliable information is taken into consideration for determining the associated fill levels L, not, however, defective information, for instance information that has become defective in the table.

Alternatively or supplementally, other review methods can be performed based on the correction line segments CB, CD2 associated with reflectors covered by fill substance 1. In the case of this method, the slopes ΔL/Δt of these correction line segments CB, CD2 are determined. The slope ΔL/Δt of a correction line segment correctly representing the measuring conditions in the container 3 and attributable to reflections on a reflector covered by fill substance 1 is a direct measure for a propagation velocity v of the signals in the fill substance 1. Correspondingly, the propagation velocity v corresponding to the ascertained slope ΔL/Δt can be calculated and compared with a reference value or a reference value range for the propagation velocity actually expected in the fill substance 1.

Also here, preferably all measurement points referenced for deriving the correction line segment CB, respectively the correction line segment CD2, are deleted, when the propagation velocity v corresponding to the ascertained slope ΔL/Δt lies outside a propagation velocity range predetermined based on the reference value or the reference value range.

Alternatively or supplementally, based on the reference value or the reference value range or alternatively based on the slope ΔL/Δt of the respective correction line segment CB, respectively CD2, a table region becoming wider with increasing fill level L can be predetermined, outside of which measurement points attributed to reflections on the associated reflector cannot actually occur. Such table regions defined around the correction line segment CB as well as around the correction line segment CD2 are shown cross-hatched in FIG. 8.

Here, current measurement points presumably associated with reflections on the container floor 15 are only incorporated as historical measurement points, when they lie within the table region around the correction line segment CB associated with reflections on the container floor 15. Likewise, current measurement points presumably associated with reflections on the disturbance 9 are only incorporated as historical measurement points, when they lie within the table region around the correction line segment CD2 associated with reflections on the disturbance 9. Measurement points lying near but outside these table ranges are either immediately deleted, or—to the extent such is possible—associated with a reflection on another reflector.

In this way, it is especially prevented that maxima of the echo functions A(t) attributed to multiple reflections of the transmission signals S on the surface of the fill substance 7 are mistakenly interpreted as maxima attributed to reflections on the container floor 15 or on the disturbance 9, and as such input into the table. By way of example, shown in FIG. 8 are multi-echo measurement points, which arise when a signal portion of the sent transmission signals S reflects on the surface of the fill substance back to the fill-level measuring device, from there back to the fill substance 1 and first following a second reflection on the surface of the fill substance 7 is received by the fill-level measuring device 5. The measurement points resulting therefrom extend above the measurement points of the fill-level echo EL along a line CME, whose travel times t increase faster with sinking fill level L than the travel times t of the line CL, along which the measurement points of the fill-level echo EL occur.

If during ongoing operation or even during an interruption of measurement operation, an additional disturbance is inserted into the container 3, such is registered as a reflector automatically in subsequent measurement operation based on the associated maxima of the echo functions (t). Correspondingly, the associated measurement points are added progressively into the table into the rows corresponding to the fill levels subsequently being visited. As soon as a sufficiently great fill level range has been passed through, the above described two correction line segments can be determined also for this newly added disturbance, and the above mentioned plausibility checks correspondingly performed.

Preferably, based on the current and historical measurement points, another plausibility check is performed, with which the distance of a disturbance registered by associated measurement points in the table from the container 3 is detected. For this, over a time range, in which the fill level passes through a fill level measuring range of predetermined minimum size, it is checked whether the current measurement points derived during this time range include measurement points, which can be associated with a reflection on the registered disturbance. If this is the case, then the registered disturbance is still present in the container 3. If this is not the case, then all historical measurement points associated with reflections on this disturbance are deleted.

In practice, situations frequently occur, in the case of which measurement operation must be temporarily interrupted. This is the case, for example, when the container 3 must be cleaned, when individual measuring devices must be re-calibrated, subjected to maintenance or replaced, or when, due to the process running in the container 3, pauses in the operation result.

Upon restart, reference is preferably made back to the above mentioned, predefined echo types associated with simple or multiple reflections on predetermined reflectors. In such case, at least two echo types are taken into consideration, of which one is necessarily the fill-level echo.

Then, the travel times t of the maxima of the echo function A(t) derived after the restart are determined, and at least two of these maxima selected. The selected maxima are combined with a number of different echo types corresponding to the number of selected maxima, of which one is necessarily the fill-level echo type.

In such case, for all possible permutations of the associating of the selected maxima to the selected echo types, in each case, the fill level resulting from such association is determined. Based on such fill level, then preliminary measurement points are determined, and a degree of agreement of the preliminary measurement points with the historical measurement points stored in the associated table row determined.

Following thereon, those preliminary measurement points are stored in the table as current measurement points, for which the highest degree of agreement occurred.

Preferably, based on the association, in the case of which the greatest agreement was determined, an echo tracking method is started, based on which at least the time development of the presumed fill-level echo is tracked and taken into consideration in subsequent measurement operation for fill level determination.

Following thereon, the current measurement points of the subsequently obtained echo functions A(t) are, in each case, stored in the row, which results from the echo tracking started based on such association.

Subsequently, based on the current and historical measurement points stored in the table, correction line segments are determined, which, in each case, reflect a dependence of fill level on the travel times associated with reflections on a determined reflector.

In such case, it is continuously checked, whether in the table, with time, a correction line segment CZ forms that extends below the correction line segment presumably attributable to reflections on the surface of the fill substance 7 and whose travel times t increase with increasing fill level L. An example of such a correction line segment CZ is shown in FIG. 9. If there is such a correction line segment CZ, then the association is recognized as corrupted, and the echo tracking continued, in that that echo to which this correction line segment CZ goes back to, is tracked further as fill-level echo EL. In that case, all measurement points referenced for determining this correction line segment CZ are deleted, and the updating of the table is continued.

The memories 17 of fill-level measuring devices comprise, as a rule, a comparatively large working memory and a comparatively small permanent memory. In ongoing operation, the current and historical measurement points can be stored interimly directly in the working memory. In order that this data does not get lost in the case of turning off the fill-level measuring device, it is in the context of the turnoff procedure preferably transferred into the permanent memory. Permanent memories are comparatively expensive, and are required in fill level measuring devices for a large amount of data, so that corresponding memory capacity is regularly scarce and costly.

For saving permanent memory capacity, consequently, for example, in the context of the turnoff procedure, based on the stored measurement points in the table in the working memory for all echo types adopted into the table correction line segments are determined, which reflect, in each case, the dependence resulting from the table of the fill level L on the travel times t of the signal fractions R reflected on the associated reflectors. Then, for each correction line segment, its beginning and endpoints are ascertained and stored in the permanent memory before the respective interruption of measurement operation.

Upon resuming measurement operation, based on the stored beginning- and end points of individual correction line segments, a table is generated, which has entries arranged distributed along the correction line segments. The table generated in this way is then applied as start table for subsequent measurement operation, wherein the entries are considered to be historical measurement points.

Preferably, supplementally to the beginning- and end points of the individual correction lines, the scattering a of the measurement points referenced for determining the respective correction line segment and located around the particular correction line segment is determined and stored together with their beginning and endpoints. This offers the advantage that entries can be generated therefrom, which have these scatterings a around the particular correction line segment. This offers the advantage that changes of the measuring conditions, which have caused these scatterings, and continue after the restart, are recognized faster, since the threshold value will be exceeded faster after the restart.

The invention claimed is:

1. A method for measuring a fill level of a fill substance in a container with a fill-level measuring device working according to a travel time principle, comprising steps of:
   the fill-level measuring device in measurement operation sends transmission signals toward the fill substance in the container, detects signal fractions reflected back in the container and, based on the signal fractions reflected back in the container, derives echo functions, which give amplitudes of the signal fractions as a function of their travel time, with assistance of a table, wherein:
   rows of the table correspond to discrete fill levels and columns of the table correspond to discrete travel times;
   information is stored as historical measurement points, in each case, in that row, whose row index corresponds to the associated fill level, and information derived from past echo functions concerning travel times of echo function maxima attributed to reflections on reflectors located in the container;
   the table is continuously updated based on current echo functions derived in ongoing measurement operation;
   information derived from current echo functions concerning travel times of echo function maxima attributed to reflections on reflectors located in the container are stored as current measurement points, in each case, in that row, whose row index corresponds to the associated fill level ascertained by the fill-level measuring device;
   a plausibility check is performed;
   historical and current measurement points recognized as implausible due to the plausibility check are deleted and all remaining current measurement points are adopted into the table as historical measurement points, and
   carrying out a subsequent fill level measurement by subsequently sending transmission signals toward the fill substance in the container, detecting signal fractions reflected back in the container, obtaining a subsequent echo function, and determining the fill level by comparing the subsequently-obtained echo function with the information adopted into the table as historical measurement points, based on a greatest agreement between the subsequently-obtained echo function and the information adopted into the table.

2. The method for fill level measurement as claimed in claim 1, wherein:
   the current measurement points are, in each case, adopted into the row corresponding to the associated fill level in a table field corresponding to the associated travel time; and
   historical measurement points already adopted into the remaining table fields of the respective row are kept in place.

3. The method for fill level measurement as claimed in claim 2, wherein:
   the measurement points reflect besides the travel time and the associated fill level supplementally the amplitude of the associated maximum of the current echo function;
   the amplitude of the associated maximum of the current echo function is stored unchanged in the associated table field, when the associated table field was empty before recording of the current measuring point; and
   from the amplitude of the historical and the amplitude of the current measuring points, a filter forms an intermediate value, which is stored in the table field as amplitude, when the associated table field was occupied with a historical measuring point before the recording of the current measuring point.

4. The method for fill level measurement as claimed in claim 1, wherein:
   based on correspondingly selected current and historical measurement points stored in the table, at least one correction line segment is determined, which shows a dependence of fill level on travel times associated with reflections on a determined reflector in the container different from the fill substance;
   the plausibility check includes a method, in the case of which a measure is determined for a scattering of the measurement points around the correction line segment and referenced for determining the respective correction line segment; and
   the current and historical measurement points referenced for determining the respective correction line segment are deleted, when the scattering exceeds a predetermined threshold value.

5. The method for fill level measurement as claimed in claim 1, wherein:
   based on correspondingly selected current and historical measurement points stored in the table, at least one correction line segment is determined, which shows a dependence of fill level on travel times associated with reflections on a determined reflector in the container different from the fill substance in a fill level range, in which this reflector is covered by fill substance;

the plausibility check includes a method, in the case of which a slope corresponding to a propagation velocity of the signals in the fill substance is determined for at least one of these correction line segments;

a propagation velocity corresponding to the slope is compared with a reference value or a reference value range for the propagation velocity expected in the fill substance; and the current and historical measurement points referenced for determining the respective correction line segment are deleted, when the propagation velocity corresponding to the ascertained slope lies outside a propagation velocity range predetermined based on the reference value or the reference value range.

6. The method for fill level measurement as claimed in claim 1, wherein:

based on correspondingly selected current and historical measurement points stored in the table, at least one correction line segment is determined, which shows a dependence of fill level on travel times associated with reflections on a determined reflector in the container different from the fill substance in a fill level range, in which such reflector is covered by fill substance; and the plausibility check includes a method, in the case of which current measurement points presumably associable with a reflection on this reflector are only accepted as historical measurement points, when they occur within a table region around this correction line segment predetermined based on a reference value or a reference value range for the propagation velocity expected in the fill substance or based on the slope of the respective correction line segment.

7. The method as claimed in claim 1, wherein:

over a time range, in which the fill level covers a fill level measuring range of predetermined minimum size, it is checked, whether the current measurement points derived during this time range include measurement points, which can be associated with a reflection on a disturbance registered in the table; and all reflections on this disturbance associated with historical measurement points are deleted, when within this period of time no current measuring point was derived, which can be associated with a reflection on the disturbance registered in the table.

8. The method for fill level measurement as claimed in claim 1, wherein:

echo types are predefined for maxima of the echo functions;

the individual echo types refer, in each case, to those maxima, which are attributable to a simple reflection or a multiple reflection on a determined reflector associated with the echo type;

the reflectors include at least one of the surface of the fill substance and the container floor;

the travel times of the maxima of an echo function derived directly after a resuming of measurement operation are determined;

at least two of these maxima are selected;

a number of echo types corresponding to the number of selected maxima are selected, of which one is necessarily the type of a fill-level echo attributable to a reflection on the surface of the fill substance;

for all possible permutations of the associating of the selected maxima to the selected echo types;

in each case, the fill level resulting from such association is determined;

in each case, preliminary measurement points are determined based on such fill level;

in each case, a degree of agreement of the preliminary measurement points with the historical measurement points stored in the associated table row is determined; and those preliminary measurement points for which the greatest agreement was determined are stored in the table as current measurement.

9. The method for fill level measurement as claimed in claim 8, wherein:

based on the association, at which the greatest agreement was determined, an echo tracking method is started, based on which at least the time development of the presumed fill-level echo is tracked;

the current measurement points obtained from subsequent echo functions based on such association are adopted into the table;

based on the current and historical measurement points stored in the table, correction line segments are determined, which, in each case, give a dependence of fill level on travel times associated with reflections on a determined reflector; and the association is eliminated, when below the correction line segment associated with reflections on the surface of the fill substance a correction line segment is present, whose travel times increase with increasing fill level.

10. The method for fill level measurement as claimed in claim 1, wherein:

based on measurement points stored in the table, correction line segments are determined, which, in each case, give a dependence of fill level on travel times associated with reflections on a determined reflector; and before each interruption of measurement operation, beginning- and end points of individual correction line segments are stored in the fill-level measuring device;

in the case of a subsequent resumption of measurement operation, based on the beginning- and end points of the correction line segments, a table is generated, which has entries arranged distributed along the correction line segments; and this table is applied as start table for subsequent measurement operation, wherein the entries are considered to be historical measurement points.

11. The method as claimed in claim 10, wherein:

for each correction line segment, a measure of scattering of the measurement points referenced for determining the respective correction line segment around the particular correction line segment is determined and stored together with their beginning and endpoints.

* * * * *